(12) United States Patent
Milne et al.

(10) Patent No.: US 7,730,545 B2
(45) Date of Patent: Jun. 1, 2010

(54) TEST ACCESS CONTROL FOR SECURE INTEGRATED CIRCUITS

(75) Inventors: George James Milne, Cambridge (GB); Andrew Brookfield Swaine, Cambridge (GB); Donald Felton, Ely (GB)

(73) Assignee: ARM Limited, Cambridge (GB)

( * ) Notice: Subject to any disclaimer, the term of this patent is extended or adjusted under 35 U.S.C. 154(b) by 1408 days.

(21) Appl. No.: 11/134,514

(22) Filed: May 23, 2005

(65) Prior Publication Data

US 2006/0282734 A1 Dec. 14, 2006

(51) Int. Cl.
*G06F 7/04* (2006.01)
*G06F 11/00* (2006.01)

(52) U.S. Cl. .......................................... 726/27; 714/25

(58) Field of Classification Search ....................... None
See application file for complete search history.

(56) References Cited

U.S. PATENT DOCUMENTS

2004/0210797 A1 * 10/2004 Kimelman et al. ............ 714/25

FOREIGN PATENT DOCUMENTS

EP 817014 A2 * 1/1998

* cited by examiner

*Primary Examiner*—Brandon S Hoffman
(74) *Attorney, Agent, or Firm*—Nixon & Vanderhye P.C.

(57) ABSTRACT

Test access to an integrated circuit 2 is controlled by the use of test access enabling keys. A plurality of different test access enabling levels may be supported corresponding to different keys. The test access control may be performed by dedicated hardware or software executing a secure privilege mode.

25 Claims, 6 Drawing Sheets

TEST ACCESS CONTROL FOR SECURE INTEGRATED CIRCUITS

BACKGROUND OF THE INVENTION

1. Field of the Invention

This invention relates to the field of integrated circuits. More particularly, this invention relates to the field of providing test access to integrated circuits, such as, for example, debug access via serial scan chains and trace access via embedded trace units.

2. Description of the Prior Art

As integrated circuits and system-on-chip designs have developed in size and complexity, the importance of thorough, quick and convenient testing tools for those designs and systems increases in importance. A significant amount of time in the development of a new integrated circuit, system-on-chip circuit or system product is devoted to the testing, validation and debugging of the design.

As an example, in the field of mobile telephones it is known to provide debug and trace test access into the telephone systems to allow these to be tested and debugged. These testing interfaces sometimes remain in place in the shipped products and can be used to diagnose additional problems when units are returned from field service.

Within the field of integrated circuits and data processing systems in general there is an increasing need for secure operation e.g. smart cards bearing integrated circuits for controlling financial transactions where the user needs to be authenticated and/or data needs to be encrypted/decrypted. As another example, copyright material owners require the use of decryption keys obtained by payment in order to access their copyright material. It is critical that the decryption keys remain secure and cannot be accessed by unauthorised persons. Accordingly, considerable effort is devoted to developing systems with secure modes of operation and that resistant to unauthorised intrusion which so as to keep secret data and operations secure. Smartcards for use in financial transactions are another example of integrated circuits with a requirement for a high degree of security.

It is known from British Published Patent Application GB-A-2,395,583 to provide an integrated circuit having a hardware control pin (JSDAEN) which it is assumed is tied down to ground (i.e. set low) in production. This assumption applies only to certain production scenarios—alternative scenarios require the pin to be set high or low according to the category of s/w developer, with all developers using standard production units. This is a potential security vulnerability.

SUMMARY OF THE INVENTION

Viewed from one aspect the present invention provides an integrated circuit comprising:

a test circuit operable to perform test operations upon at least a portion of said integrated circuit; and a test rights controller operable to receive and authenticate a test access request; wherein if a received test access request passes authentication by said test rights controller, then said test rights controller is operable to permitted said test circuit to perform a level of test operations corresponding to said received test access request; and if said received test access request does not pass authentication by said test rights controller, then said test rights controller is operable to prevent said test circuit performing test operations.

The present invention provides integrated circuit components for use within an integrated circuit which addresses the above problems. The present invention recognises testing capabilities built into integrated circuit designs can also represent a significant vulnerability in the security of those systems. Testing mechanisms often need to have low level access to all of the data and state within a system to ensure that thorough test coverage can be achieved. This potentially allows unauthorised users to obtain access to secret information, such as cryptographic keys, passwords, etc. Whilst one approach might be to remove the test mechanisms (or disable with fusable links) in production devices, this still leaves a vulnerability during the development phase and inhibits the ability to test and debug faulty units returned from field use. In order to address these problems, the present technique provides test access control using test right enabling keys or trusted test access request sources which are received and authenticated by the test mechanisms themselves before those test mechanisms will permit test access. This approach allows the test mechanisms to remain in place, which is desirable so as to avoid having to change the circuit after it has been tested and also the test mechanisms such that the test mechanisms may be used to test field return units. The technique may also allow the managed control of access to different levels of test access, i.e. authorise the appropriate level.

Whilst there are a variety of different possible ways in which the test access enabling keys may be stored and provided to the integrated circuit, one advantageous arrangement uses an interface circuit within the integrated circuit to read the key from an external data storage device and a key authenticator to authenticate the key. The key authenticator may also be software as this allows a desirable degree of sophistication in the way in which the key may be encoded and/or validated.

The trusted sources of test access requests which are authenticated by virtue of originating from a trusted source can take a variety of forms, e.g. smart cards, SIMs, etc.

The external data storage device could take a wide variety of different forms. Advantageous forms are, for example, a subscriber identification module, a smart card and a memory card. Integrated circuits often have interfaces already provided for communicating with such data storage devices in their normal operation and accordingly these interfaces can be reused for the provision of the test rights enabling key to the integrated circuit.

Another approach to the authentication of the test rights enabling key and the control of test rights access is to use a software controlled processor within the integrated circuit to execute test rights controlling software to provide these functions. Secure systems which particularly benefit from this type of test access control often already have mechanisms and structures for providing secure execution environments and these can be reused by the test rights controlling software. Within such systems the test rights controlling software executes in a secure mode, and advantageously in the most secure mode.

Such test rights controlling software can effect control of the test access at a hardware level by writing appropriate flags within a test access control register which is inaccessible outside of the secure mode in which the test writes controlling software executes. The accessibility of the test access control register can in turn be managed by an appropriate memory mapping which is mode dependent. The enabling of test operations can also be made dependent upon which software tasks are executing a particular time with this being monitored by the test rights controlling software.

Another mechanism for the provision of the test rights enabling key is to utilise a test data channel itself to introduce this key. An example of such a test data channel is a serial scan chain, e.g. a JTAG scan chain.

As examples of advantageous ways in which the level of test access may be controlled, it is advantageous to provide integrated circuits with a test access level enabling non-intrusive trace and a different test access level enabling interruption of data processing operations. The different levels of test access may also be linked to the processing mode of a software control processor within the integrated circuit. Different levels of test access may also correspond to different portions of a system-on-chip design. Examples of test operations which may be performed are capture of data values from an integrated circuit, writing of data values to an integrated circuit, setting break points in programs and setting watchpoints for data values.

The test circuits whose operation is controlled by the test rights enabling keys can take a wide variety of different forms. Advantageous forms are serial scan chains and trace data capture circuits.

Viewed from another aspect the present invention provides a method controlling test access to an integrated circuit comprising:

providing a test circuit operable to perform test operations upon at least a portion of said integrated circuit; and receiving and authenticating a test access request with a test right controller; wherein if a received test access request passes authentication, then said test circuit is permitted to perform a level of test operations corresponding to said received test access request; and if said received test rights enabling key does not pass authentication, then said test circuit is not permitted to perform test operations.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
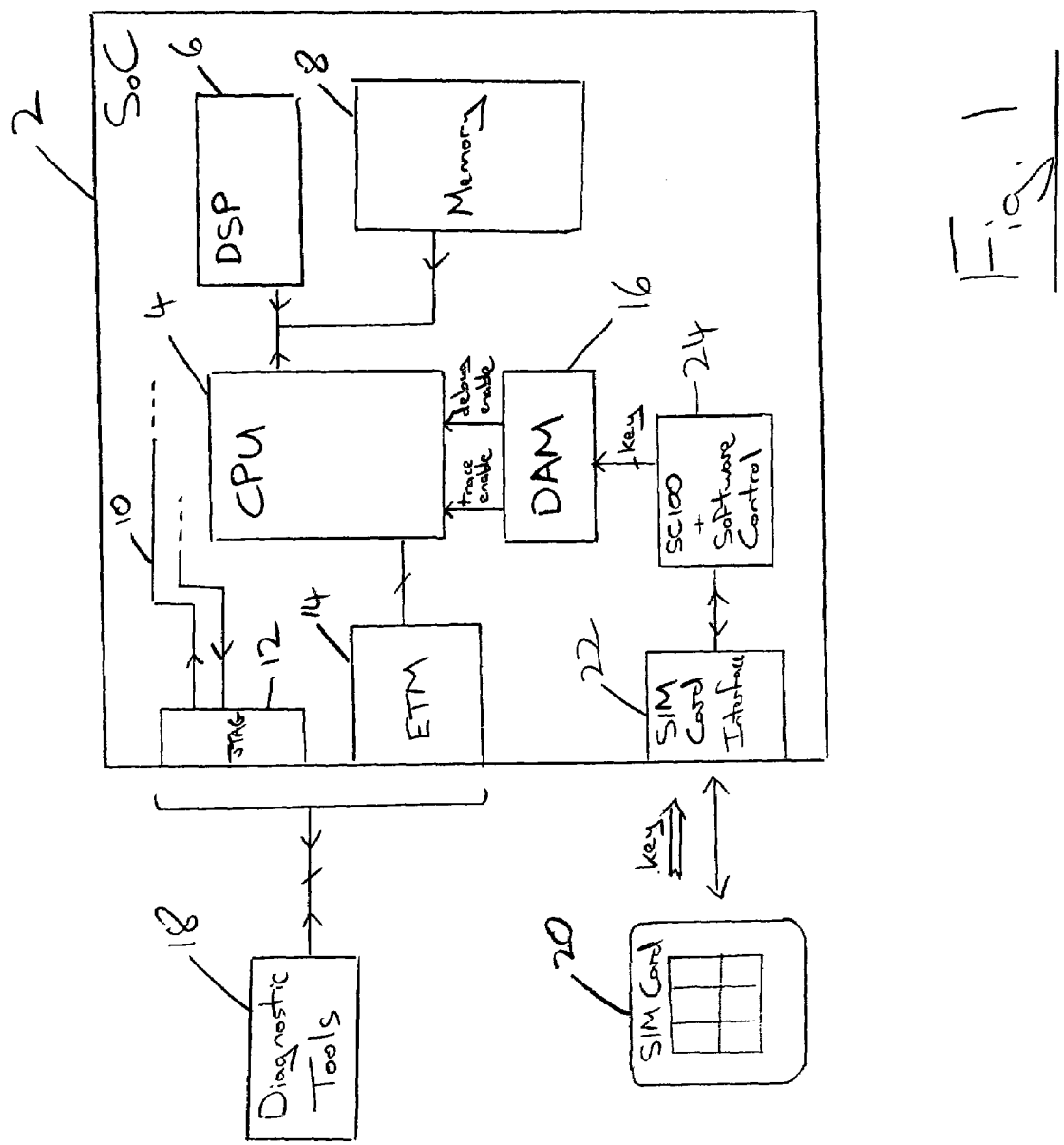
FIG. 1 schematically illustrates a first embodiment of a test access controlling mechanism within an integrated circuit.

FIG. 1 illustrates an integrated circuit 2 in the form of a system-on-chip integrated circuit including a software controlled processor 4, a DSP circuit 6 and a memory 8. It will be appreciated that such integrated circuits 2 typically include many further circuit elements, but these have not been described herein for the sake of clarity.

Test mechanisms provided within the integrated circuit 2 include serial scan chains 10 controlled via a JTAG interface 12 as well as an embedded trace macrocell 14 for providing non-invasive tracing of operations performed by the processor 4.

A debug access module 16 (which may also be known as a debug authentication module) provides trace enable and debug enable signals to the processor 4. These signals selectively enable and disable the serial scan chain and/or debug circuits and/or the tracing circuits within the processor 4. Thus, these test access mechanisms can be disabled when the processor is in field use and it is desired to prevent unauthorised access to secure data which may be being manipulated by the processor 4 stored within the memory 8. The serial scan chains 10 and the embedded trace macrocell 14 are linked to diagnostic tools 18, which typically include an interface module and a software controlled general purpose computer.

In this embodiment, the trace access enabling key is stored within a subscriber identification module card 20. This sort of SIM card 20 is typically used in mobile telephones and the integrated circuit 2 will normally already have an SIM card interface circuit 22 which in operational use communicates with and reads data from such a SIM card 20. In the context of the present technique, the SIM card interface circuit 22 reads the test access enabling key from the SIM card 20 and passes this to a software controlled processor 24. This may be a compact and secure processor, such as a smartcard processor (e.g. the SC100 processor produced by ARM Limited), which acting under software control decrypts and validates/authenticates the key which has been provided. The processor 24 serving as the test rights controller can passes an enabling signal to the debug access module 26 if the key is appropriately validated to trigger the debug access module 16 to enable one or both of the trace functions or debug functions of the processor 4. Different test rights enabling keys have different levels of test access authorisation, e.g. trace only, debug only, processor only, full SoC access etc. The SIM card 20 may optionally be a trusted device. Such a trusted device may issue test access requests which are authenticated without use of a key by virtue of originating from a trusted device.

Figure 2:
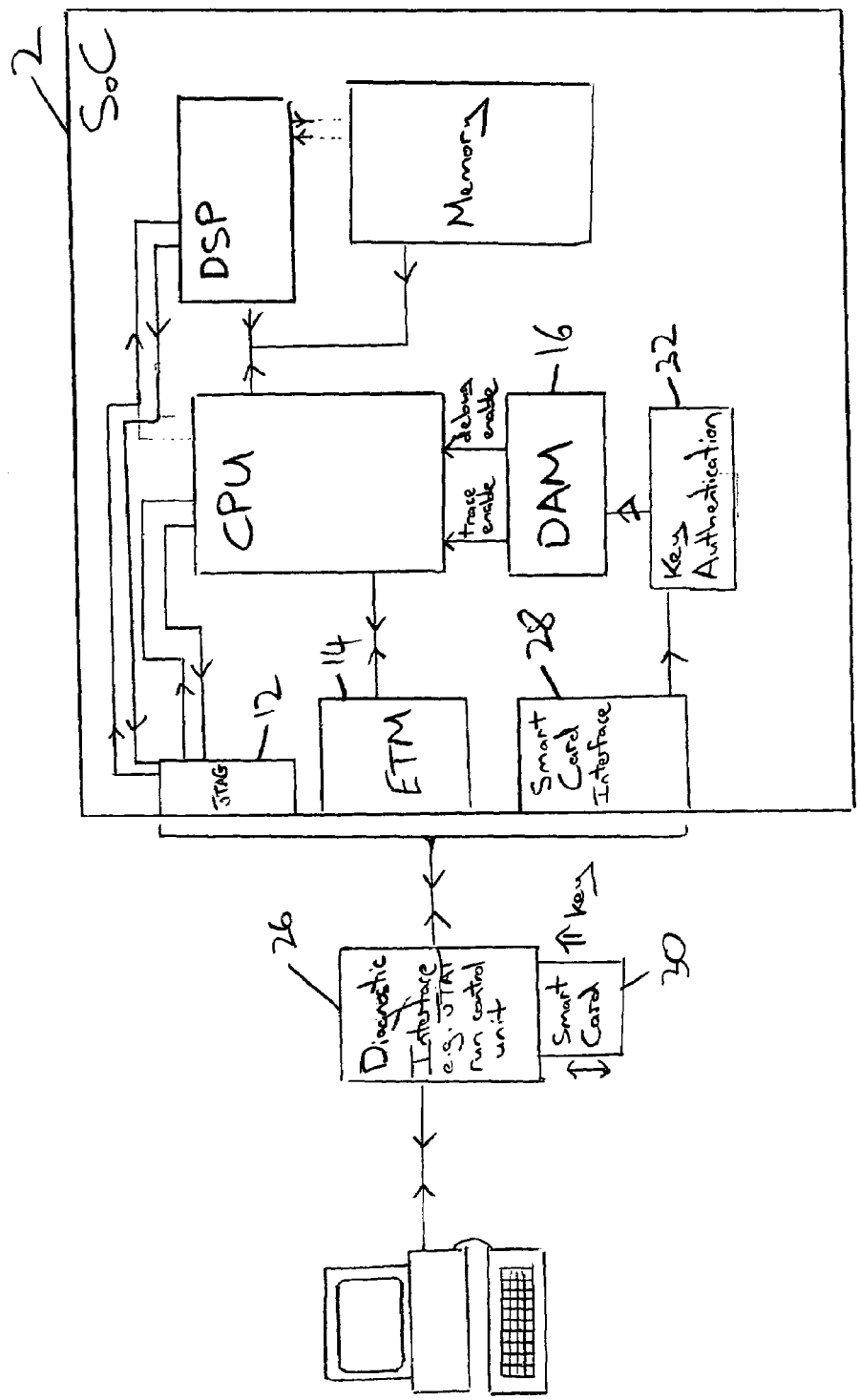
FIG. 2 schematically illustrates a second embodiment of a test access controlling mechanism within an integrated circuit.

FIG. 2 illustrates a second example embodiment. In this embodiment, the test access enabling key is carried by a smartcard which is inserted within a diagnostic interface unit 26 which is coupled to the JTAG interface 12, the embedded trace module 14 and a smartcard interface 28. The smartcard interface 28 reads the test access enabling key from the smartcard 30 and pass this to a key authenticating circuit 32, which in turn triggers the debug access module 16 to enable or disable various levels of test access to the integrated circuit 2. The key authentication circuit 32 may also form part of the debug access module 16.

Figure 3:
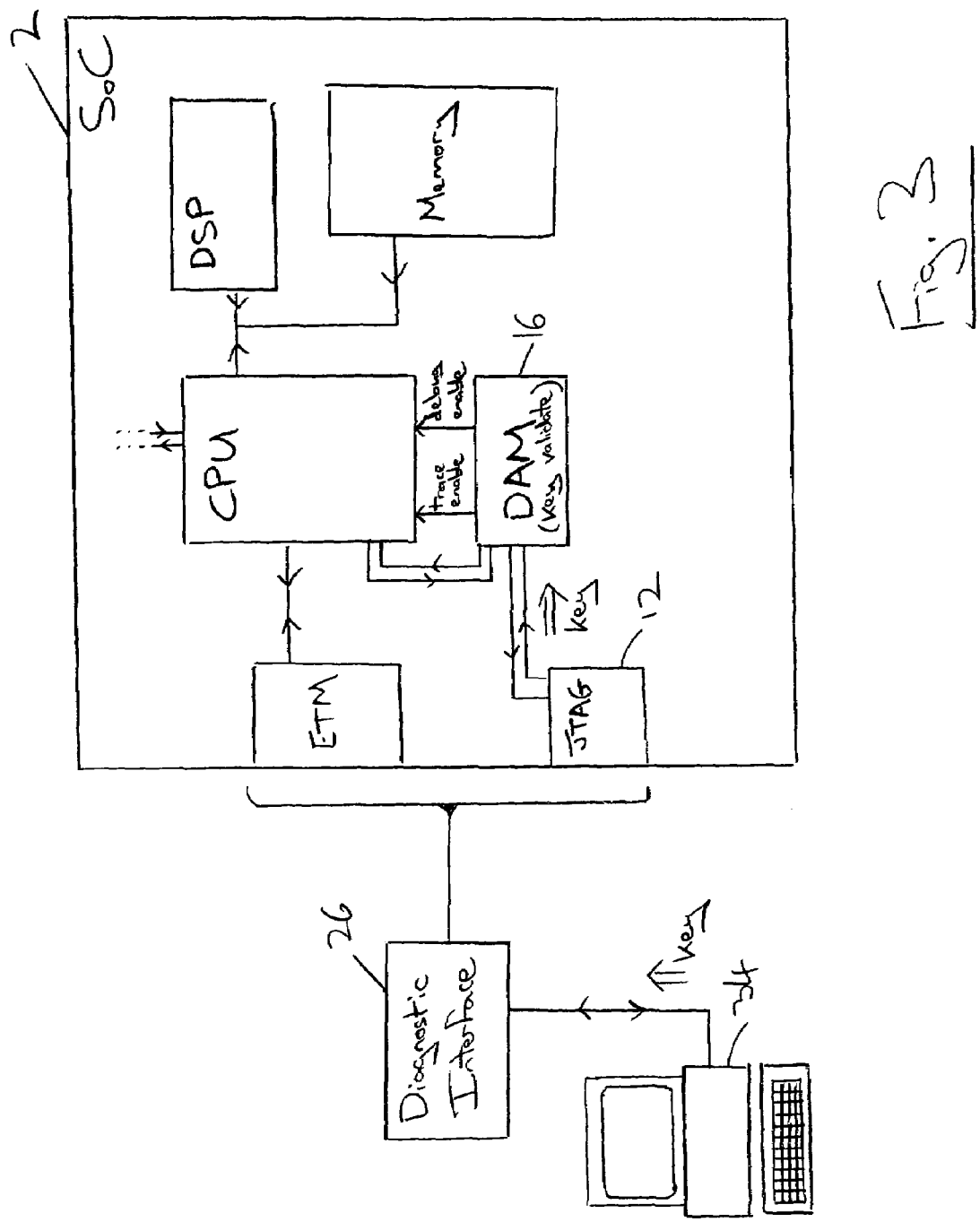
FIG. 3 schematically illustrates a third embodiment of a test access controlling mechanism within an integrated circuit.

FIG. 3 is a further example embodiment. In this embodiment a user inputs at a general purpose computer 34 a test access enabling key which is passed via the diagnostic interface circuit 26 and the JTAG interface 12 directly to the debug access module 16. In this case, the debug access module 16 serves to compare the received key with one or more authentic keys stored within the debug access module to validate the received key and appropriately enable the test access functions upon the integrated circuit 2. The JTAG interface 12 and the debug access module 16 serve to provide serial scan chain access only to the debug access module 16 itself until a proper authenticated test access enabling key has been received.

Figure 4:
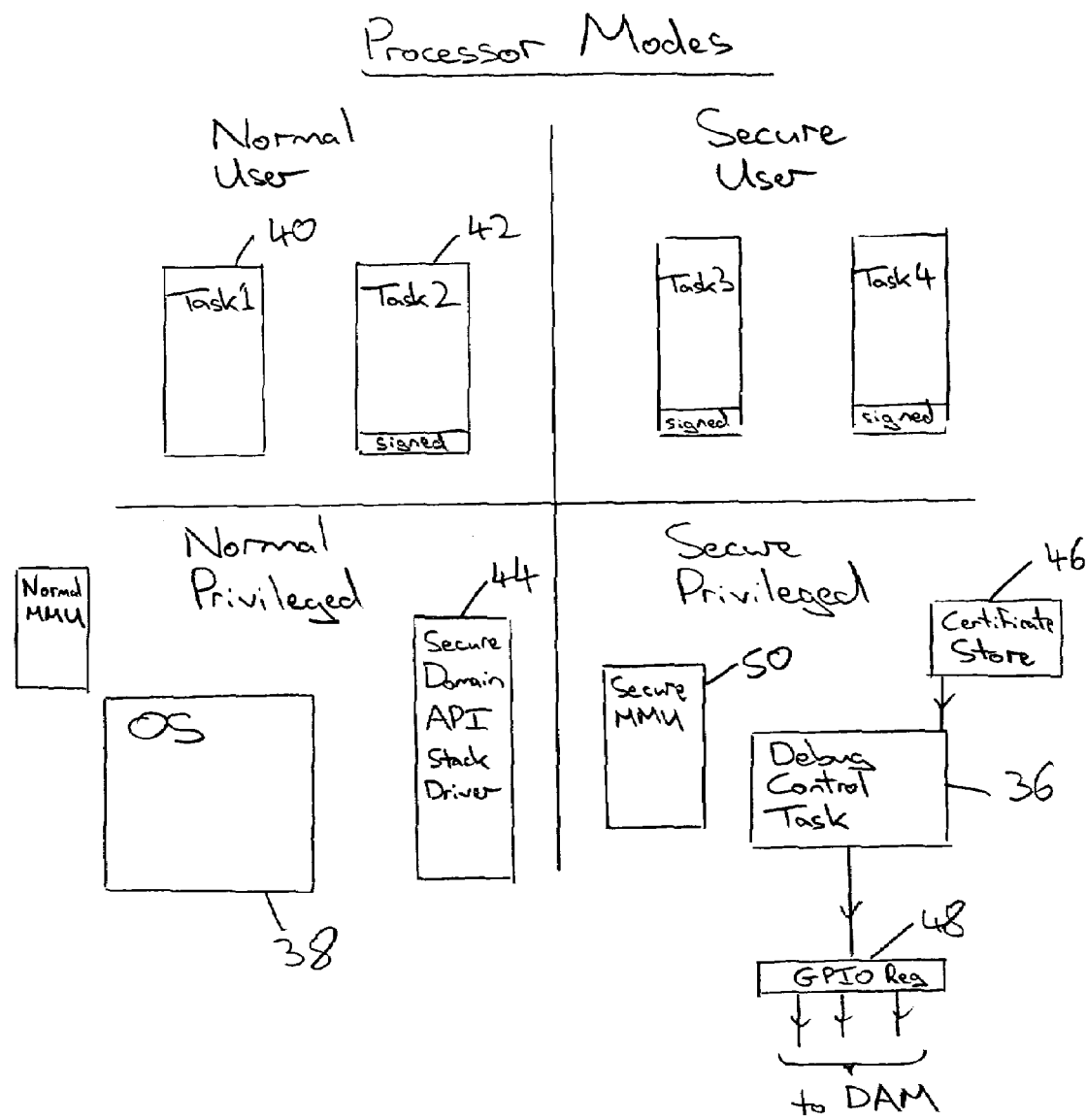
FIG. 4 schematically illustrates processor modes of a software control processor incorporating a test access controlling program executing within a secure privileged mode.

FIG. 4 illustrates another example embodiment in which the test access controller is provided in the form of a debug controlling task 36 executing within a secure privileged mode within the secure domain of a software controlled processor. In the example of FIG. 4, there is shown a secure domain including a secure privilege mode and a secure user mode.

The normal domain includes a normal privilege mode and a normal user mode. The normal privileged mode is used to execute an operating system 38 which controls several normal user mode tasks 40, 42, some of which may be signed for the purposes of authentication. A secure domain API stack driver 44 allows the operating system 38 to pass data values across into the secure domain comprising the secure privilege mode and the secure user mode. The data values passed across by the secure domain API stack driver 44 can include candidate test access enabling keys. These are read by a debug control task 36 executing within the secure privilege mode (the most secure operating mode) and compared with keys stored within a certificate store 46. If an appropriate match is found, then a flag value or several flag values are written to a general purpose input output register 48 which is memory mapped by a secure MMU 50 so as to be accessible only within the secure privilege mode. The flag values from within this GPIO register 48 then serve to control the debug access module 16 as illustrated in the various previous examples. The debug controlling task 36 also monitors which tasks executed in the secure user mode are active at a particular time and selectively enables and disables the test access depending upon which tasks are currently active.

Figure 5:
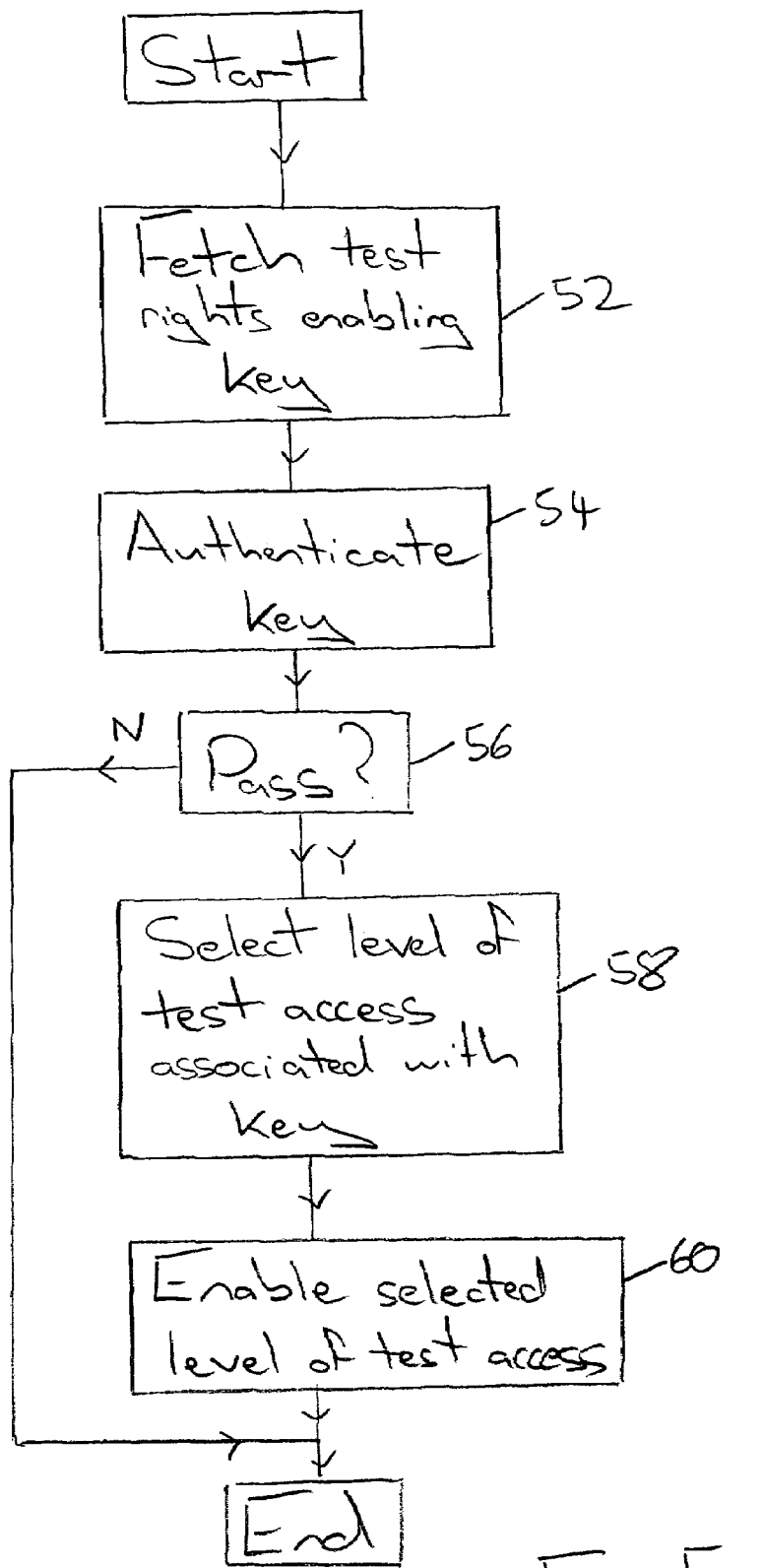
FIG. 5 is a flow diagram schematically illustrating the operation of a test access controlling mechanism.

FIG. 5 schematically illustrates a flow diagram for the control of test access. At step 52 a test rights enabling key is fetched from a data store. At step 54 this key is subject to an authentication test. At step 56 a determination is made as to whether or not the authentication was passed. If the authentication was not passed, then the process terminates. If the authentication was passed, then step 58 selects the level of test access associated with the particular key which has been authenticated. Step 60 then enables the selected level of test access within the integrated circuit 2. Such test access is typically revoked upon system restart or reboot or earlier. In the case of the embodiment using the debug controlling software executing within a secure privilege mode, provision may be made, with some embodiments, to allow test access immediately upon reboot for one reboot only to enable the test access to be available for debugging the early part of the operation of the integrated circuit following such a reboot.

Figure 6:
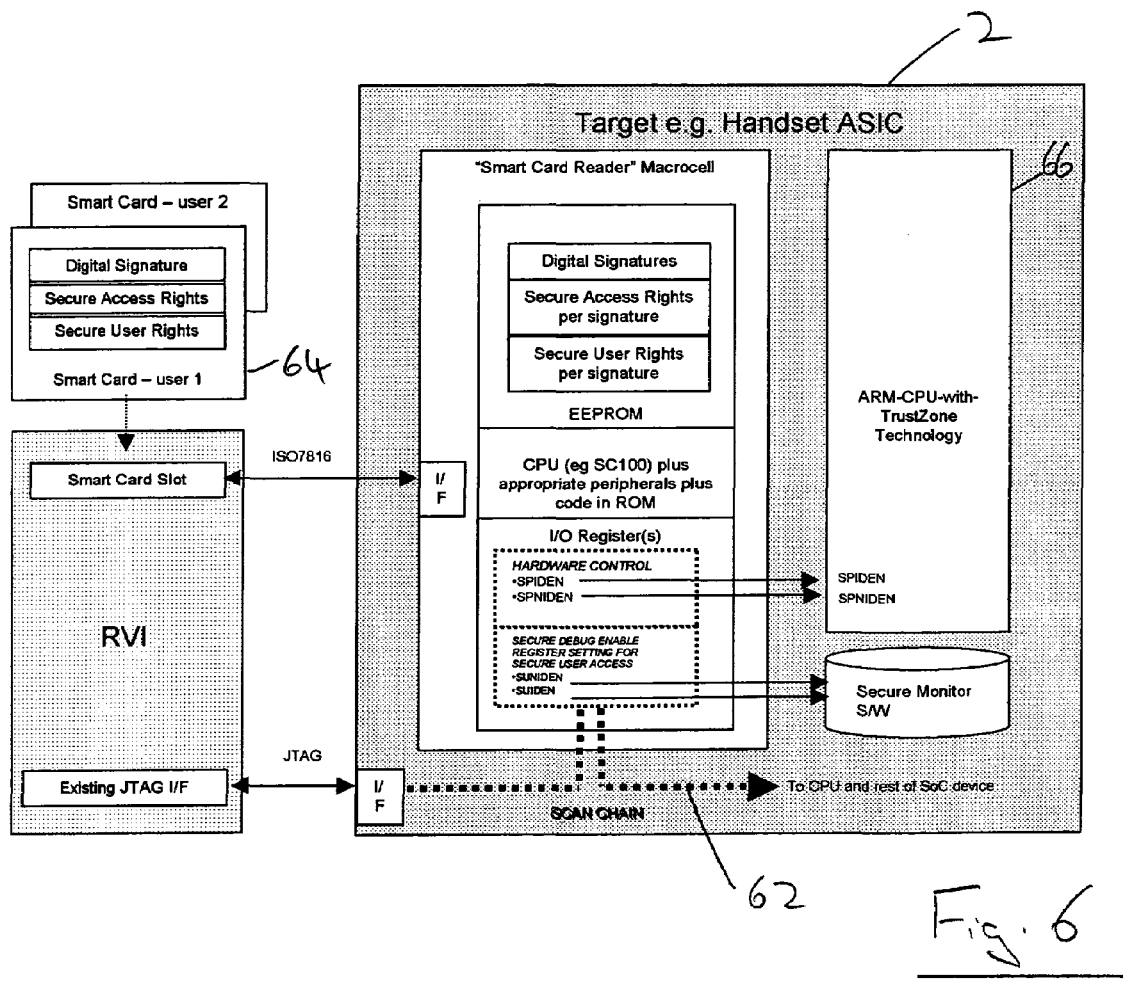
FIG. 6 is a further example embodiment of an integrated circuit having a test access controlling mechanism.

FIG. 6 schematically illustrates a further example embodiment. In this embodiment an integrated circuit 2 in the form of a mobile phone handset ASIC is provided with test access mechanisms in the form of scan chains 62. A smartcard 64 bears a test access enabling key which is used to selectively enable the scan chains to operate upon the processor 66 and other parts of the ASIC 2.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. An integrated circuit comprising:
    a test circuit configured to perform test operations upon at least a portion of said integrated circuit; and
    a test rights controller configured to receive and authenticate a test access request; wherein
    if a received test access request passes authentication by said test rights controller, then said test rights controller is configured to permit said test circuit to perform a level of test operations corresponding to said received test access request; and
    if said received test access request does not pass authentication by said test rights controller, then said test rights controller is operable to prevent said test circuit performing test operations, wherein said test access request includes a test rights enabling key and said test rights controller comprises:
    an interface circuit configured to read said test rights enabling key from an external data storage device; and
    a key authenticator configured to authenticate said test rights enabling key read from said external data storage device.

2. An integrated circuit as claimed in claim 1, wherein if said test access request is received from a trusted source, then said test rights controller permits said test circuit to perform said level of test operations.

3. An integrated circuit as claimed in claim 1, wherein said key authenticator is a software controlled processor configured to compare said test rights enabling key with one or more predetermined authentic test rights enabling keys stored within said test rights controller.

4. An integrated circuit as claimed in claim 1, wherein said external data storage device is one of:
    a subscriber identification module;
    a smart card; and
    a memory card.

5. An integrated circuit as claimed in claim 1, wherein said test rights controller is configured to receive said test rights enabling key via a test data channel.

6. An integrated circuit as claimed in claim 5, wherein said test data channel is a serial scan chain.

7. An integrated circuit as claimed in claim 1, wherein said test circuit is configured to provide a plurality of levels of tests operations.

8. An integrated circuit as claimed in claim 7, wherein said plurality of levels include:
    a level enabling test operations which non-intrusively trace data processing operations within said integrated circuit; and
    a level enabling test operations which interrupt data processing operations within said integrated circuit.

9. An integrated circuit as claimed in claim 7, wherein said plurality of levels include different levels correspond to permitting or not permitting test operations during associated modes of operation of a software controlled processor within said integrated circuit.

10. An integrated circuit as claimed in claim 7, wherein said plurality of levels include different levels correspond to permitting or not permitting test operations to be performed upon different portions of a system-on-chip integrated circuit.

11. An integrated circuit as claimed in claim 1, wherein said test operations include one or more of:
    capture of data values from said integrated circuit;
    writing of data values to said integrated circuit;
    setting breakpoints in programs executing on said integrated circuit; and
    setting watchpoints for data values accessed by said integrated circuit.

12. An integrated circuit as claimed in claim 1, wherein said test circuit includes one or more of:
    serial scan chains; and
    a trace data capture circuit.

13. An integrated circuit comprising:
    test circuit means for performing test operations upon at least a portion of said integrated circuit; and
    test rights controller means for receiving and authenticating a test access request; wherein
    if a received test access request passes authentication by said test rights controller means, then said test controller means is configured to permit said test circuit to perform a level of test operations corresponding to said received test access request; and if said received test access request does not pass authentication by said test rights controller, then said test rights controller means is configured to prevent said test circuit means performing test operations, wherein said test access request includes a test rights enabling key and said test rights controller means comprises:

an interface circuit means for reading said test rights enabling key from an external data storage device; and a key authentication means for authenticating said test rights enabling key read from said external data storage device.

14. A method controlling test access to an integrated circuit comprising:

providing a test circuit configured to perform test operations upon at least a portion of said integrated circuit; and receiving and authenticating a test access request with a test right controller; wherein if a received test access request passes authentication, then said test circuit is permitted to perform a level of test operations corresponding to said received test access request; and if said received test rights access request does not pass authentication, then said test circuit is not permitted to perform test operations, wherein said test access request includes a test rights enabling key and said test rights controller comprises:

an interface circuit configured to read said test rights enabling key from an external data storage device; and a key authenticator configured to authenticate said test rights enabling key read from said external data storage device.

15. A method as claimed in claim 14, wherein if said test access request is received from a trusted source, then said test rights controller permits said test circuit to perform said level of test operations.

16. A method as claimed in claim 14, wherein said key authenticator is a software controlled processor is operable to compare said test rights enabling key with one or more predetermined authentic test rights enabling keys stored within said test rights controller.

17. A method as claimed in claim 14, wherein said external data storage device is one of:
 a subscriber identification module;
 a smart card; and
 a memory card.

18. A method as claimed in claim 14, wherein said test rights controller is configured to receive said test rights enabling key via a test data channel.

19. A method as claimed in claim 18, wherein said test data channel is a serial scan chain.

20. A method as claimed in claim 14, wherein said test circuit is configured to provide a plurality of levels of tests operations.

21. A method as claimed in claim 20, wherein said plurality of levels include:
 a level enabling test operations which non-intrusively trace data processing operations within said integrated circuit; and
 a level enabling test operations which interrupt data processing operations within said integrated circuit.

22. A method as claimed in claim 20, wherein said plurality of levels include different levels correspond to permitting or not permitting test operations during associated modes of operation of a software controlled processor within said integrated circuit.

23. A method as claimed in claim 20, wherein said plurality of levels include different levels correspond to permitting or not permitting test operations to be performed upon different portions of a system-on-chip integrated circuit.

24. A method as claimed in claim 14, wherein said test operations include one or more of
 capture of data values from said integrated circuit;
 writing of data values to said integrated circuit;
 setting breakpoints in programs executing on said integrated circuit; and
 setting watchpoints for data values accessed by said integrated circuit.

25. A method as claimed in claim 14, wherein said test circuit includes one or more of:
 serial scan chains; and
 a trace data capture circuit.

* * * * *